United States Patent
Roberge (10) Patent No.: US 10,968,760 B2
(45) Date of Patent: Apr. 6, 2021

(54) GAS TURBINE ENGINE COMPONENT FOR ACOUSTIC ATTENUATION

(71) Applicant: United Technologies Corporation, Farmington, CT (US)

(72) Inventor: Gary D. Roberge, Tolland, CT (US)

(73) Assignee: RAYTHEON TECHNOLOGIES CORPORATION, Waltham, MA (US)

(*) Notice: Subject to any disclaimer, the term of this patent is extended or adjusted under 35 U.S.C. 154(b) by 196 days.

(21) Appl. No.: 15/951,289

(22) Filed: Apr. 12, 2018

(65) Prior Publication Data

US 2019/0316477 A1    Oct. 17, 2019

(51) Int. Cl.
  *F01D 9/02* (2006.01)
  *F01D 11/00* (2006.01)

(52) U.S. Cl.
  CPC .............. *F01D 9/02* (2013.01); *F01D 11/001* (2013.01); *F05D 2220/323* (2013.01); *F05D 2240/55* (2013.01); *F05D 2250/283* (2013.01); *F05D 2260/20* (2013.01); *F05D 2260/96* (2013.01)

(58) Field of Classification Search
  CPC ... F01D 5/08; F01D 5/00; F01D 25/04; F01D 11/12; F01D 11/122; F01D 11/125; F01D 11/127; F01D 9/02; F05D 2220/323; F05D 2240/55; F05D 2250/283; F05D 2260/20; F05D 2260/96; F05D 2260/963; F02C 7/24; F04D 29/66; F04D 29/663; F04D 29/664
  See application file for complete search history.

(56) References Cited

U.S. PATENT DOCUMENTS

| 4,240,252 A | 12/1980 | Sargisson et al. |
| 4,411,592 A * | 10/1983 | Traver ................ F04D 29/668 181/225 |
| 4,741,153 A * | 5/1988 | Hallinger ............ F01D 5/082 415/116 |
| 4,869,640 A * | 9/1989 | Schwarz ............. F01D 5/081 415/115 |
| 4,920,741 A * | 5/1990 | Liebl ..................... F02C 7/18 60/785 |

(Continued)

FOREIGN PATENT DOCUMENTS

| DE | 102007023380 | 11/2008 |
| EP | 2412924 | 2/2012 |

(Continued)

OTHER PUBLICATIONS

European Search Report for European Patent Application No. 19168780.5 completed Jul. 31, 2019.

*Primary Examiner* — Nathaniel E Wiehe
*Assistant Examiner* — Hakeem M Abdellaoui
(74) *Attorney, Agent, or Firm* — Carlson, Gaskey & Olds, P.C.

(57) ABSTRACT

A section for a gas turbine engine according to an example of the present disclosure includes, among other things, a rotor having a hub carrying a plurality of blades, the hub rotatable about a longitudinal axis, and a seal extending outwardly from the hub to establish a sealing relationship with a plurality of vanes distributed about the longitudinal axis. A flow guide assembly is secured to an engine static structure such that a flow path is defined between the hub and the flow guide assembly. The flow path has an inlet portion defined along the seal and an outlet portion, and the flow guide assembly includes an acoustic liner that extends along the flow path.

9 Claims, 5 Drawing Sheets

(56) References Cited

U.S. PATENT DOCUMENTS

| | | | |
|---|---|---|---|
| 5,291,672 A | 3/1994 | Brown | |
| 5,472,313 A * | 12/1995 | Quinones | F01D 5/082 415/115 |
| 8,287,242 B2 * | 10/2012 | Bifulco | F01D 5/066 416/244 A |
| 2002/0079159 A1 * | 6/2002 | Liu | F04D 29/4213 181/210 |
| 2012/0027575 A1 * | 2/2012 | Manzoori | F01D 11/02 415/174.5 |
| 2012/0168248 A1 * | 7/2012 | Burak | F01D 25/162 181/292 |
| 2013/0025967 A1 * | 1/2013 | Seib | F04D 29/023 181/292 |
| 2013/0156553 A1 * | 6/2013 | Mitaritonna | F01D 11/127 415/170.1 |
| 2013/0259659 A1 * | 10/2013 | Knaul | F16J 15/4472 415/170.1 |
| 2014/0127007 A1 * | 5/2014 | Aiello | F01D 11/001 415/173.7 |
| 2014/0248122 A1 * | 9/2014 | Vetters | F02C 7/18 415/1 |
| 2015/0063983 A1 * | 3/2015 | Boeck | F01D 5/081 415/116 |
| 2015/0071760 A1 * | 3/2015 | Liu | F04D 29/441 415/1 |
| 2015/0233580 A1 | 8/2015 | Olsen et al. | |
| 2015/0252751 A1 * | 9/2015 | Baltas | F02K 1/827 60/771 |
| 2016/0215646 A1 * | 7/2016 | Gonyou | F01D 11/18 |
| 2016/0230778 A1 * | 8/2016 | Mekid | G10K 11/002 |
| 2016/0305267 A1 * | 10/2016 | Clouse | F01D 11/127 |
| 2016/0362995 A1 * | 12/2016 | Albers | F01D 5/027 |
| 2017/0198708 A1 * | 7/2017 | Wilber | F01D 5/08 |
| 2017/0342851 A1 | 11/2017 | Narasimharao et al. | |
| 2019/0211748 A1 * | 7/2019 | Pastouchenko | B64D 33/02 |

FOREIGN PATENT DOCUMENTS

| | | |
|---|---|---|
| FR | 2955152 | 7/2011 |
| GB | 2407344 | 4/2005 |

* cited by examiner

GAS TURBINE ENGINE COMPONENT FOR ACOUSTIC ATTENUATION

BACKGROUND

This disclosure relates to acoustic attenuation, and more particularly for acoustic attenuation for adjacent components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The compressor and turbine sections may include multiple stages of rotatable blades and static vanes. Each section may define one or more passages for communicating airflow to cool portions of the engine.

SUMMARY

A section for a gas turbine engine according to an example of the present disclosure includes a rotor having a hub carrying a plurality of blades, the hub rotatable about a longitudinal axis, and a seal extending outwardly from the hub to establish a sealing relationship with a plurality of vanes distributed about the longitudinal axis. A flow guide assembly is secured to an engine static structure such that a flow path is defined between the hub and the flow guide assembly. The flow path has an inlet portion defined along the seal and an outlet portion, and the flow guide assembly includes an acoustic liner that extends along the flow path.

In a further embodiment of any of the foregoing embodiments, the seal is a knife edge seal including one or more knife edge portions supported by a neck portion. The neck portion extends radially outward from the hub with respect to the longitudinal axis.

In a further embodiment of any of the foregoing embodiments, the acoustic liner is radially inward of the neck portion with respect to the longitudinal axis, and the hub and the flow guide assembly are dimensioned such that the flow path slopes radially inward from the neck portion to the outlet portion with respect to the longitudinal axis.

In a further embodiment of any of the foregoing embodiments, the knife edge seal establishes the sealing relationship with an abradable honeycomb structure mounted to the plurality of vanes in response to rotation of the rotor about the longitudinal axis.

In a further embodiment of any of the foregoing embodiments, the acoustic liner defines at least one resonant chamber dimensioned with respect to an acoustic frequency range relating to the flow path.

In a further embodiment of any of the foregoing embodiments, the acoustic liner includes first and second face sheets that establish the at least one resonant chamber, and the acoustic liner includes a honeycomb core disposed in the at least one resonant chamber. The honeycomb core has a plurality of honeycomb cells.

In a further embodiment of any of the foregoing embodiments, surfaces of the first face sheet bounding the flow path define a plurality of perforations that interconnect the flow path and the plurality of honeycomb cells.

In a further embodiment of any of the foregoing embodiments, the at least one resonant chamber includes a first resonant chamber adjacent the inlet portion and a second resonant chamber adjacent the outlet portion. The acoustic frequency range relating to the first resonant chamber differs from the acoustic frequency range relating to the second resonant chamber.

In a further embodiment of any of the foregoing embodiments, the seal is a knife edge seal that includes one or more knife edge portions supported by a neck portion, the neck portion extends radially outward from the hub with respect to the longitudinal axis, and the inlet portion extends between the neck portion and surfaces of the first face sheet.

In a further embodiment of any of the foregoing embodiments, the hub and the flow guide assembly are dimensioned such that the flow path slopes radially inward from the inlet portion to the outlet portion with respect to the longitudinal axis.

In a further embodiment of any of the foregoing embodiments, the section is a high pressure compressor section of the gas turbine engine.

A gas turbine engine according to an example of the present disclosure includes a fan section having a plurality of fan blades rotatable about an engine longitudinal axis, and a compressor section that defines a core flow path. The compressor section has a first compressor and a second compressor downstream of the first compressor, a combustor section in fluid communication with the compressor section, and a turbine section that drives the compressor section and the fan section. At least one of the compressor section and the turbine section has a rotor assembly. The rotor assembly includes a rotor that has a hub carrying a plurality of blades, the hub rotatable about the engine longitudinal axis, and a seal that extends outwardly from the hub to establish a sealing relationship with a plurality of vanes distributed about the engine longitudinal axis. A flow guide assembly is arranged about the longitudinal axis. The flow guide assembly is secured to an engine static structure such that an annular flow path is defined between the hub and the flow guide assembly. The flow path has an inlet portion defined along the seal and an outlet portion, and the flow guide assembly that has an acoustic liner that extends about the longitudinal axis to bound the flow path.

In a further embodiment of any of the foregoing embodiments, the second compressor section comprises the rotor assembly, and the outlet portion communicates with a cooling plenum that extends radially inward of a combustor of the combustor section with respect to the engine longitudinal axis.

In a further embodiment of any of the foregoing embodiments, the seal includes one or more knife edge portions supported by a neck portion. The neck portion extends radially outward from the hub with respect to the engine longitudinal axis.

In a further embodiment of any of the foregoing embodiments, walls of the hub that define the flow path slope radially inward from the neck portion toward the engine longitudinal axis such that inlet portion is radially outward of the outlet portion.

A method of sealing of a gas turbine engine according to an example of the present disclosure includes rotating a knife edge seal about an engine longitudinal axis, the knife edge seal having one or more knife edge portions supported by a neck portion, and the neck portion extends radially outward from a hub with respect to the engine longitudinal axis, and communicating flow between a core flow path and an annular flow path. The flow path is defined between the hub and a flow guide assembly such that the flow path slopes towards the engine longitudinal axis. The flow guide assembly includes an acoustic liner that extends about the longitudinal axis to bound the flow path.

In a further embodiment of any of the foregoing embodiments, the hub is a compressor hub that carries a plurality of blades rotatable about the engine longitudinal axis.

In a further embodiment of any of the foregoing embodiments, the acoustic liner defines at least one resonant chamber dimensioned with respect to an acoustic frequency range such that the step of communicating the flow causes the at least one resonant chamber to at least partially attenuate acoustic energy in the acoustic frequency range relating to the annular flow path.

In a further embodiment of any of the foregoing embodiments, the acoustic liner includes a honeycomb core disposed in the at least one resonant chamber, surfaces of the acoustic liner define a plurality of perforations interconnecting the flow path and a plurality of honeycomb cells of the honeycomb core, and the plurality of perforations are defined with respect to the acoustic frequency range.

In a further embodiment of any of the foregoing embodiments, the flow path extends between an inlet portion and an outlet portion. At least one resonant chamber has a first resonant chamber adjacent the inlet portion and a second resonant chamber adjacent the outlet portion, and the acoustic frequency range relating to the first resonant chamber differs from the acoustic frequency range relating to the second resonant chamber.

The various features and advantages of this invention will become apparent to those skilled in the art from the following detailed description of an embodiment. The drawings that accompany the detailed description can be briefly described as follows.

DETAILED DESCRIPTION

Figure 1:
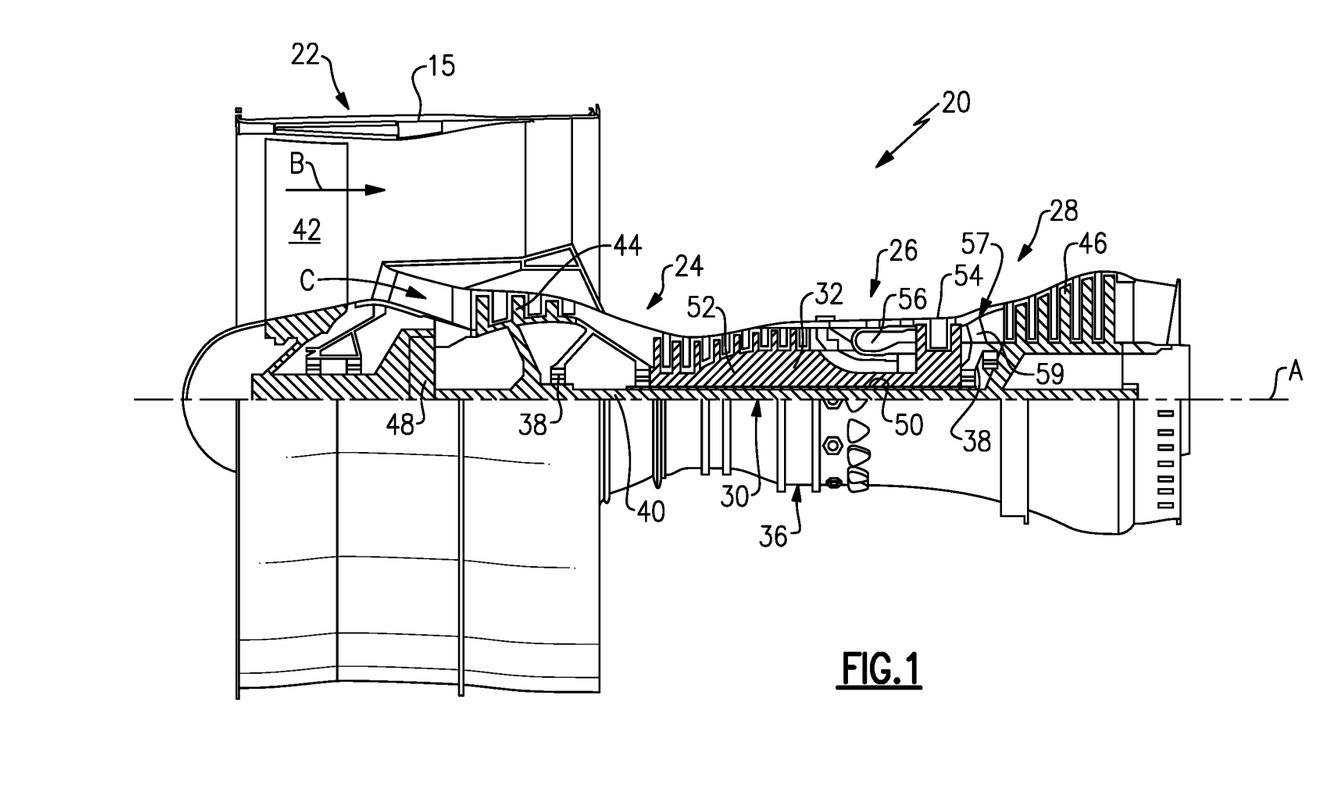
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
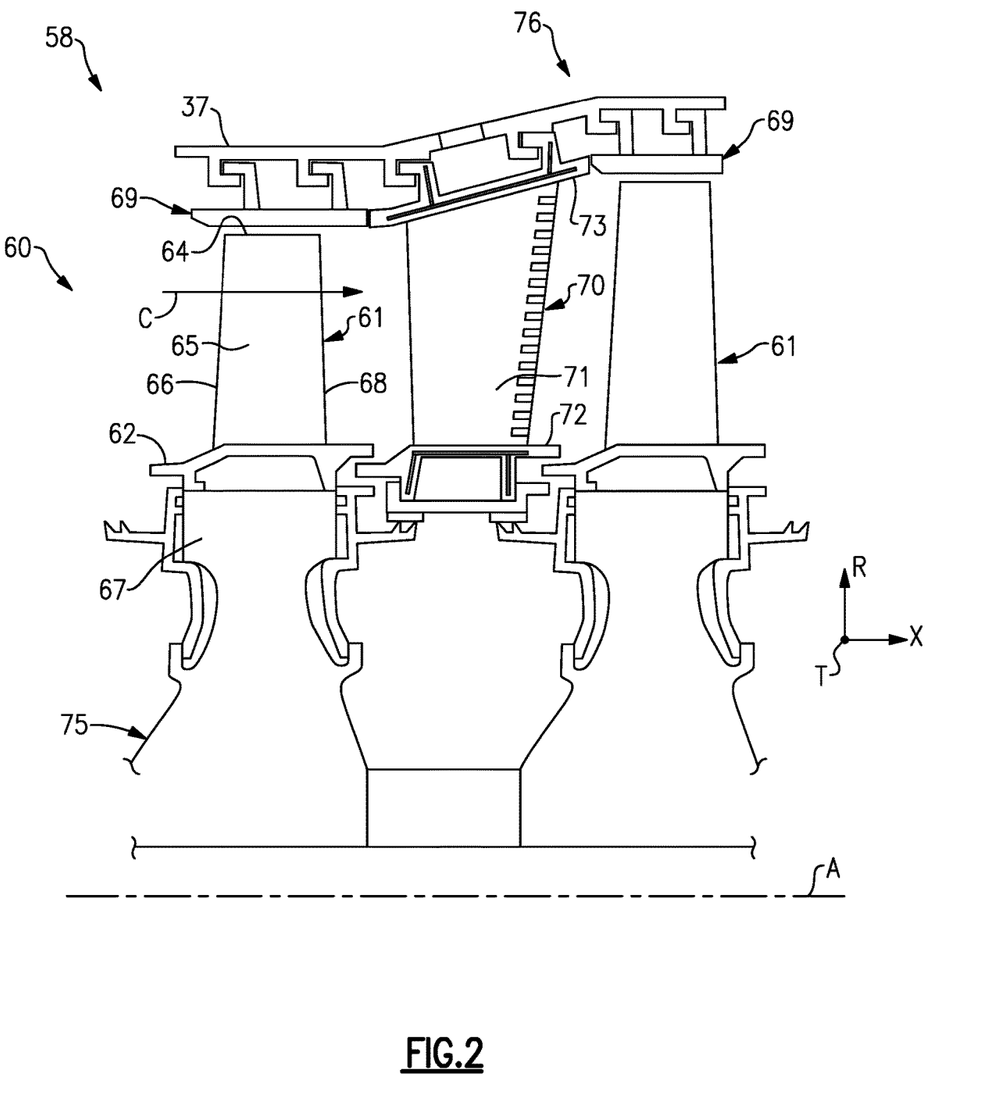
FIG. 2 shows an airfoil arrangement for a section of a gas turbine engine.

FIG. 2 shows selected portions of a section 58 of a gas turbine engine. The section 58 can be incorporated into compressor section 24 or turbine section 28 of engine 20, such as high pressure compressor 52, for example. The section 58 includes a rotor assembly 60 having a rotor 75 carrying one or more blades or airfoils 61 that are rotatable about the engine axis A.

Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 75. A blade outer air seal (BOAS) 69 is spaced radially outward from the tip 64 of the airfoil section 65. The tips 64 of each of the airfoil sections 65 and adjacent BOAS 69 are in close radial proximity to reduce the amount of gas flow that escapes around the tips 64 through a corresponding clearance gap.

A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS 69 arranged circumferentially about the engine axis A. An array of the BOAS 69 are distributed about an array of the airfoils 61 to bound the core flow path C. The BOAS 69 and vanes 70 can be secured to the engine case 37, for example. The engine case 37 provides a portion of the engine static structure 36 (FIG. 1) and extends along the engine axis A.

Figure 3:
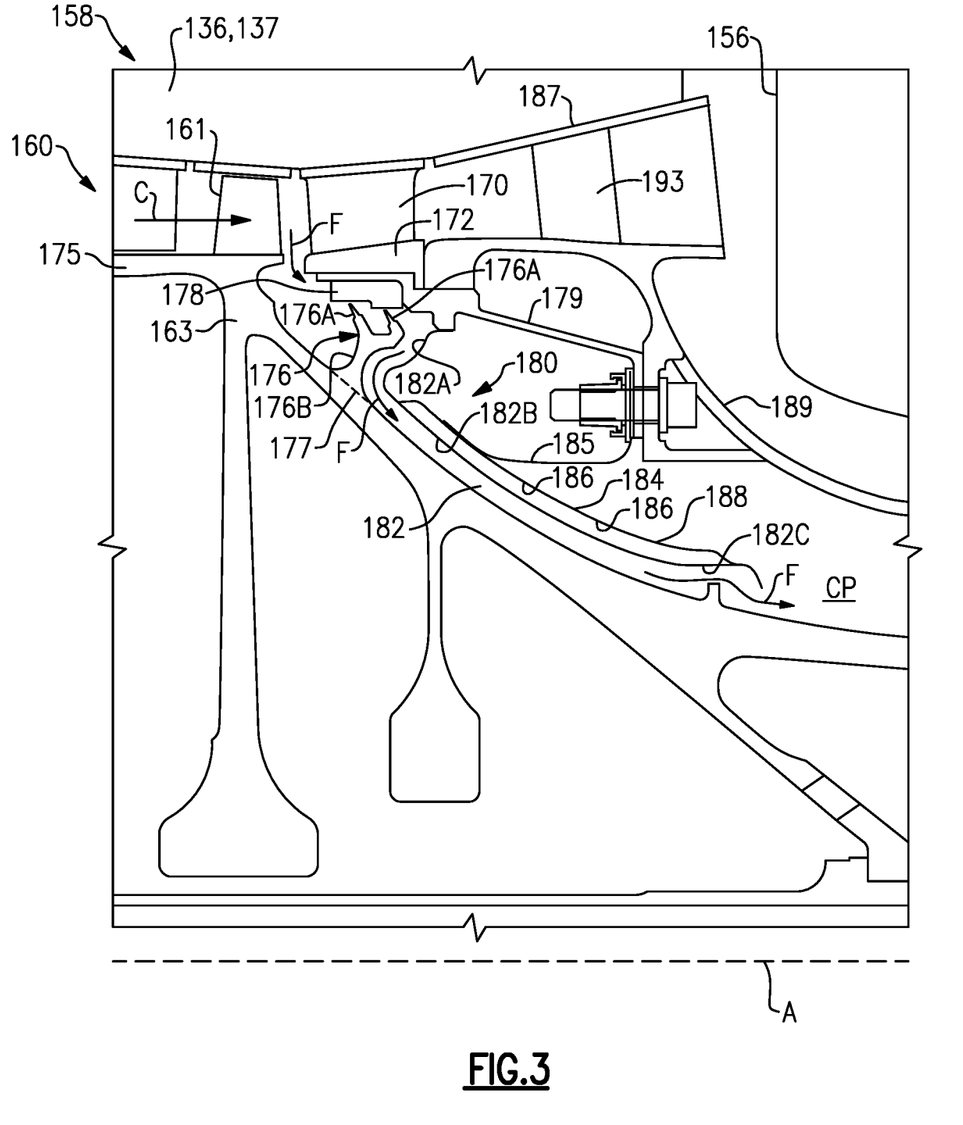
FIG. 3 illustrates a section of a gas turbine engine including a flow guide assembly according to an example.
Figure 4:
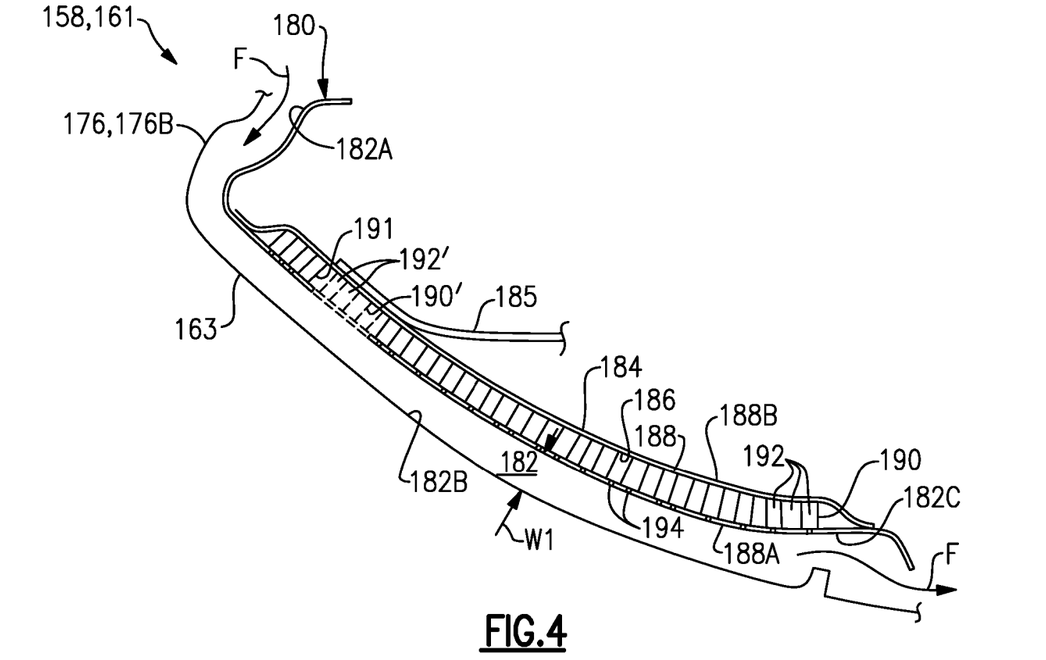
FIG. 4 illustrates the flow guide assembly of FIG. 3.

FIGS. 3 and 4 illustrate a section 158 for a gas turbine engine. In this disclosure, like reference numerals designate like elements where appropriate and reference numerals with the addition of one-hundred or multiples thereof designate modified elements that are understood to incorporate the same features and benefits of the corresponding original elements. Section 158 can be incorporated into compressor section 24 or turbine section 28 of engine 20, for example. In the illustrated example of FIGS. 3 and 4, the hub 163 is a compressor hub that carries a plurality of blades or airfoils 161. In some examples, section 158 is a high pressure compressor section of a gas turbine engine, such as high pressure compressor 52. Other locations of the engine can benefit from the teachings herein, such as low pressure compressor 44 or one of the turbines 46, 54 of FIG. 1. Other systems can also benefit from the teachings disclosed herein, including ground-based power generation systems.

Section 158 includes a rotor 175 having a hub 163 that carries a plurality of blades or airfoils 161. The airfoils 161 can be arranged in one or more stages (an aftmost stage shown for illustrative purposes). The hub 163 and airfoils 161 are rotatable about longitudinal axis A. The rotor 175 can be mechanically coupled to a turbine, such as high pressure turbine 54 (FIG. 1).

A rotating seal 176 extends outwardly from the hub 163 to establish a sealing relationship with a row of stationary vanes 170 (one shown for illustrative purposes) distributed about the longitudinal axis A and associated supporting structure. Each seal 176 can include one or more segments arranged about the longitudinal axis A to define a substantially hoop-shaped or annular geometry.

In the illustrated example of FIG. 3, seal 176 is a knife edge seal that includes one or more knife edge portions 176A supported by a neck portion 176B. Knife edge seal portions may be angled forward as shown relative to a radial line extending outward from centerline axis A. Seal portions may also be angled rearward or not angles at all such that they extend in a purely radial direction. The neck portion 176B extends radially outward from the hub 163 with respect to the longitudinal axis A. The neck portion 176B can be swept about the longitudinal axis A to have a substantially annular geometry. In some examples, the rotating seal 176 can establish a sealing relationship with a stationary abradable honeycomb structure 178. The honeycomb structure 178 can be mounted to a seal carrier 179 or directly to an undersurface of platforms 172 of the vanes 170. The seal 176 can establish the sealing relationship in response to rotation of the rotor 175 about the longitudinal axis A.

The assembly 160 includes a static flow guide assembly 180 that is dimensioned to guide flow F along a flow path 182. The flow F can be bleed air from the core flow path C, for example. The flow guide assembly 180 can be mounted or otherwise secured to an inner case 189 or another portion of the engine static structure 136 such that the flow path 182 is defined between surfaces of the hub 163 and the flow guide assembly 180. Although the flow guide assembly 180 is primarily discussed as a static component and the hub 163 is primarily discussed as a rotating component, the teachings herein can benefit other arrangements, such as adjacent components that are both stationary or that are both rotating.

The hub 163 and flow guide assembly 180 can be circumferentially swept about the longitudinal axis A such that the flow path 182 is an annular flow path. The flow guide assembly 180 can be contoured to reduce windage and control temperature and/or pressure of flow F through the flow path 182.

The flow path 182 includes an inlet portion 182A, an intermediate portion 182B, and an outlet portion 182C that are established along the flow guide assembly 180. The intermediate portion 182B interconnects the inlet and outlet portions 182A, 182C. An end of the inlet portion 182A can be defined along the seal 176.

The outlet portion 182C can communicate with a cooling plenum CP. In the illustrated example of FIG. 3, the cooling plenum CP extends radially inward of combustor 156 with respect to the longitudinal axis A. The cooling plenum CP can be bounded between the radially outer surfaces of the hub 163 and radially inner surfaces of the inner case 189. The cooling plenum CP can deliver the flow F from the flow path 182 to other portions of the engine, such as the bearing systems 38 and/or turbine section 28 (FIG. 1), for example.

In the illustrated examples of FIGS. 3 and 4, the hub 163 and flow guide assembly 180 are dimensioned such that at least the intermediate portion 182B of the flow path 182 slopes radially inward from the neck portion 176B and/or inlet portion 182A to the outlet portion 182C with respect to the longitudinal axis A, with the inlet portion 182A radially outward of the outlet portion 182C. Walls of the hub 163 that define the flow path 182 slope radially inward from the neck portion 176B toward the engine longitudinal axis A such that the walls more gradually taper towards the outlet portion 182C.

Communication of flow F through the flow path 182 may cause an acoustic or unsteady flow field. The unsteady flow fields may be caused by pressure pulses in the flow path 182 during operation, for example. The acoustic or unsteady flow field alone or coupled with structural resonance modes may cause vibratory loads in components adjacent to the flow path 182, such as the hub 163. The vibratory loads may be communicated to other portions of the rotor 175, such as neck portion 176B, and may cause mechanical fatigue or cracking during operation. For example, vibratory loads communicated to the neck portion 176B may cause the neck portion 176B to pivot or rock back and forth during operation. The motion of this rocking may be amplified at knife edge seal locations 176A and may serve to either maintain or amplify the acoustic or unsteady flow field experienced in flow path 182.

The flow guide assembly 180 includes one or more acoustic attenuation features for reducing vibratory loads in adjacent components of a gas turbine engine. The flow guide assembly 180 includes at least one acoustic liner 184. The acoustic liner 184 can include one or more segments that are arranged in an array about the longitudinal axis A to bound flow path 182. The acoustic liner 184 can be arranged about the longitudinal axis A to form a full-hoop structure.

The acoustic liner 184 can be structurally tuned with respect to a predetermined frequency or frequency range(s) that correspond to one or more expected or observed acoustic signature(s) relating to the flow path 182, which can reduce vibratory loads in components adjacent to the flow path 182. The acoustic signature(s) can be based on a geometry of the flow path 182 and/or the manner in which flow F is communicated to the flow path 182 (e.g., pressure and/or velocity of flow, steady or unsteady flow rate as established in part by the gap between knife edge seal 176A and honeycomb seal land 178, operating condition including temperature effect on speed of sound, etc.). The frequency of interest can be a single predetermined frequency or group of predetermined frequencies within the acoustic frequency spectrum, for example.

The acoustic liner 184 can extend along at least a portion or the entirety of the flow path 182. In the illustrated example of FIGS. 3 and 4, the acoustic liner 184 extends along the flow path 182 between the inlet and outlet portions 182A, 182C. The acoustic liner 184 extends along the intermediate portion 182C, and is radially inward of the neck portion 176B of the seal 176 with respect to the longitudinal axis A. The hub 163 and flow guide assembly 180 can be dimensioned such that the flow path 182 has a substantially constant cross-sectional width W1 at locations along the acoustic liner 184 and such that walls of the hub 163 are substantially parallel to walls of the hub 163 to control windage and promote flow in a generally radially inward direction between entrance 182A and exit 182C, as illustrated by FIG. 4.

The acoustic liner 184 can define at least one resonant chamber 186. The resonant chamber 186 can be dimensioned or otherwise tuned with respect to an acoustic frequency or frequency range relating to the flow path 182. The acoustic liner 184, including resonant chamber 186, can be located axially aft of an aftmost row of airfoils 161 or compression stage of the section 158.

In the illustrated example of FIGS. 3 and 4, the resonant chamber 186 is spaced apart from the inlet portion 182A. Said differently, the resonant chamber 186 and the acoustic liner 184 do not extend completely between the outermost ends of the inlet and outlet portions 182A, 182C. In some examples, the acoustic liner 184 extends along the entirety of the flow path 182 established by the flow guide assembly 180.

In the illustrated example of FIG. 3, at least a portion of the acoustic liner 184, including resonant chamber 186, is axially aligned with an exit diffuser 187. The exit diffuser 187 is downstream of an axially aftmost stage of the section 158 and establishes an exit of the section 158 along the core flow path C for providing compressed core airflow to the combustor 156. The exit diffuser 187 can include a row of exit vanes 193 that extend across the core flow path C between conical continuous full hoop inner and outer walls intended to slow the velocity of core flow path C prior to feeding a downstream volume containing combustor 156. The exit diffuser 187 can be mounted to the inner case 189 or another portion of the engine static structure 136.

Referring to FIG. 4, with continuing reference to FIG. 3, the acoustic liner 184 can include a shell 188 which defines the resonant chamber 186. The shell 188 includes at least first and second face sheets 188A, 188B. The inlet portion 182A can extend between the neck portion 176B and surfaces of the first face sheet 188A.

The flow guide assembly 180 includes a flange 185 that can be mechanically attached to the second face sheet 188B or another portion of the shell 188. The flange 185 can be mechanically attached to the engine static structure 136 to fixedly secure the acoustic liner 184. In the illustrative example of FIG. 3, the flange 185 is mechanically attached to the inner case 189 at a location that is radially inward of the core flow path C.

The first and second face sheets 188A, 188B are attached or otherwise joined to one another to establish the resonant chamber 186. The acoustic liner 184 can include at least one core 190 that is disposed in the respective resonant chamber 186. The flow guide assembly 180 including the shell 188 and core 190 can be made of a high temperature metal or alloy, such as a nickel alloy, for example. The shell 188 can be formed from machined or sheet metal. Ends of the face sheets 188A, 188B can be crushed and rolled to provide a desired contour and free-end stiffness. The face sheets 188A, 188B can be welded or brazed to the core 190, for example.

Figure 5:
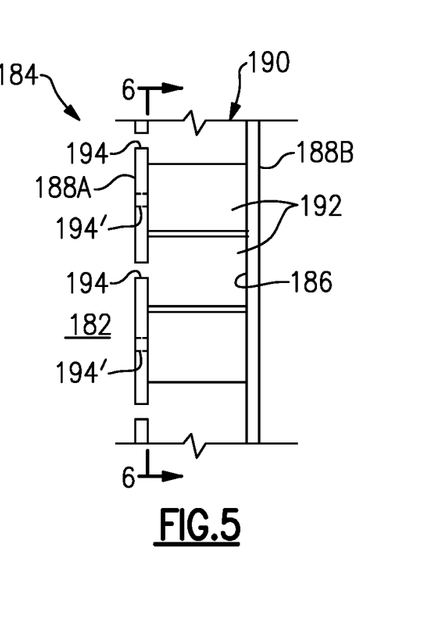
FIG. 5 illustrates a portion of the flow guide assembly of FIG. 4.
Figure 6:
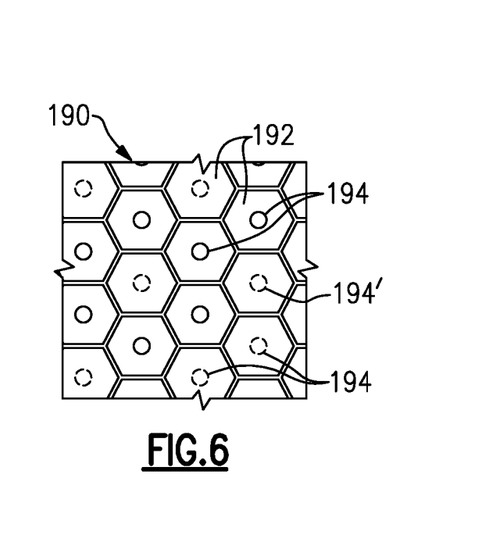
FIG. 6 illustrates a sectional view of the flow guide assembly along line 6-6 of FIG. 5.

In the illustrated example of FIGS. 4-6, the core 190 is a honeycomb structure including a plurality honeycomb cells 192. The honeycomb cells 192 are distributed between the first and second face sheets 188A, 188B within the resonant chamber 186. The honeycomb cells 192 defines integral resonant sub-chambers that are acoustic attenuating and tuned to a predetermined frequency or frequency range. Each cell 192 can have a hexagonal cross-sectional geometry, for example.

Surfaces of the first face sheet 188A that bound adjacent portions of the flow path 182 can define a plurality of perforations 194. The perforations 194 serve to interconnect the flow path 182 and honeycomb cells 192. Some of the honeycomb cells 192 can be provided with perforations 194, but others may not. In some examples, each of the honeycomb cells 192 includes perforations 194, 194' (perforations 194' shown in dashed lines). The perforations 194 can be defined in the shell 188 prior to or after forming the face sheet 188A in the desired geometry. The inherent stiffness of the structure of the core 190 including honeycomb cells 192 can drive the component's natural frequency relatively higher, resulting in a relatively lesser "woofer" effect. Utilizing the techniques disclosed herein, one would understand how to set the number and dimensions (e.g., depth, width, perforation hole size, etc.) of the resonant chamber(s) 186, honeycomb cells 192 and perforations 194 to tune the acoustic liner(s) 184 to the desired predetermined frequency or frequency range.

Referring back to FIG. 4, the acoustic liner 184 can define a counterbore 191 for providing access to enable backside resistance welding of the shell 188 and flange 185. The counterbore 191 can remain open after the shell 188 is mechanically attached to the flange 185. In some examples, a core 190' (shown in dashed lines) is secured in the counterbore 191 to establish a smooth, and generally continuous surface along the flow path 182. The core 190' can incorporate the features of core 190 as disclosed herein, including honeycomb cells 192'.

Figure 7:
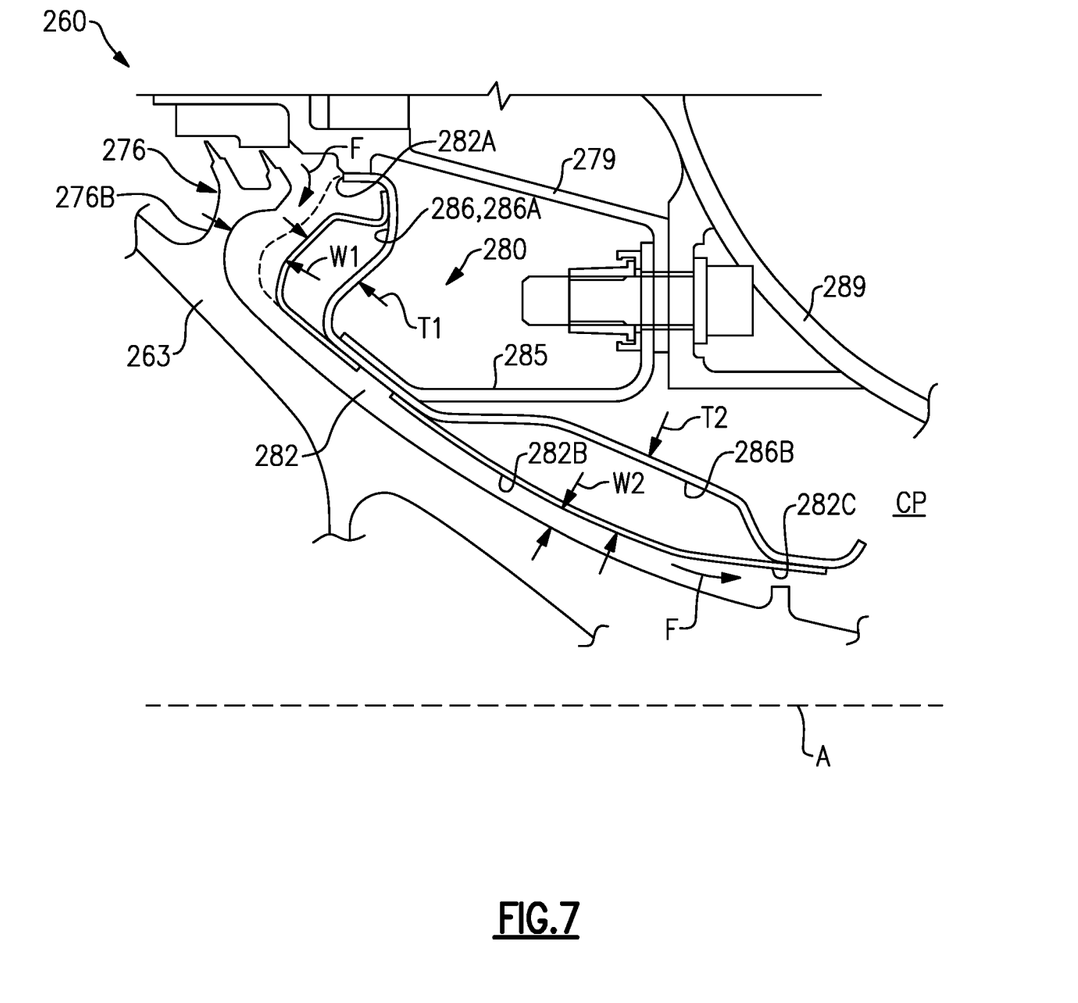
FIG. 7 illustrates a section of a gas turbine engine including a flow guide assembly according to another example.

FIG. 7 illustrates a rotor assembly 260 according to another example. The rotor assembly 260 may experience acoustic or unsteady flow fields along different portions of flow path 282 that are characterized by different frequencies or frequency ranges. Flow guide assembly 280 includes a plurality of resonant chambers 286 each tuned to a respective predetermined acoustic frequency or frequency range relating to flow path 282 and/or adjacent components. In the illustrative example of FIG. 7, flow guide assembly 280 includes a first resonant chamber 286A adjacent the inlet portion 282A and a second resonant chamber 286B adjacent to the outlet portion 282C. The second resonant chamber 286B is separate and distinct from the first resonant chamber 286A. The first and second resonant chambers 286A, 286B are spaced apart along the flow path 282. In other examples, the second resonant chamber 286A extends from the first resonant chamber 286B.

The resonant chambers 286A, 286B can be tuned to attenuate acoustic energy along localized regions of the flow path 282. Each of the resonant chambers 286A, 286B can be dimensioned relating to a predetermined acoustic frequency or frequency range relating to adjacent portions of the flow path 282 and/or adjacent components. The predetermined acoustic frequency or frequency range relating to the first resonant chamber 286A can be the same or can differ from the predetermined acoustic frequency or frequency range relating to the second resonant chamber 286B, for example.

In the illustrated example of FIG. 7, the first resonant chamber 286A has a thickness T1 that is less than a thickness T2 of the second resonant chamber 286B. The thicknesses T1, T2 can be an average thickness or a maximum thickness between opposed sidewalls of the respective chambers 286A, 286B. Thickness T1 and T2 in combination with geometry of the flow guide assembly 280 establish volumes of each chamber 286A and 286B. Each of the resonant chambers 286A, 286B can be free of any core, or can incorporate a core, such as the core 190 of FIGS. 3 and 4.

The hub 263 and flow guide assembly 280 can be dimensioned such that the flow path 282 has a cross-sectional width that varies at locations along the acoustic liner 284, as illustrated by FIG. 7. A cross-sectional width W1 of the flow path 282 along the inlet portion 282A can differ from a cross-sectional width W2 of the flow path 282 along an intermediate portion 282B of the flow path 282. For example, width W1 can be greater than width W2 (dimension of width W2 along the inlet portion 282A shown in dashed lines for illustrative purposes).

The rotor assembly 160/260 operates as follows. Rotor 175/275 including seal(s) 176/276 is rotated about the longitudinal axis A. Flow F is communicated between core flow path C and annular flow path 182/282. The resonant chamber(s) 186/286 of the acoustic liner 184/284 are dimensioned with respect to a predetermined acoustic frequency or frequency range(s) such that communicating the flow F causes the resonant chamber(s) 186/286 to at least partially attenuate acoustic energy in the acoustic frequency range relating to the flow path 182/282.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A section for a gas turbine engine comprising:
a rotor including a hub carrying a plurality of blades, the hub rotatable about a longitudinal axis, and a seal that extends outwardly from the hub to establish a sealing relationship with a plurality of vanes distributed about the longitudinal axis; and
a flow guide assembly secured to an engine static structure such that a flow path is defined between the hub and the flow guide assembly, the flow path including an inlet portion defined along the seal and an outlet portion, and the flow guide assembly including an acoustic liner that extends along the flow path;
wherein the acoustic liner defines at least one resonant chamber dimensioned with respect to an acoustic frequency range relating to the flow path;
wherein the acoustic liner includes first and second face sheets that establish the at least one resonant chamber, and the acoustic liner includes a honeycomb core disposed in the at least one resonant chamber, the honeycomb core including a plurality of honeycomb cells;
wherein surfaces of the first face sheet bounding the flow path define a plurality of perforations that interconnect the flow path and the plurality of honeycomb cells;
wherein the at least one resonant chamber includes a first resonant chamber adjacent the inlet portion and a second resonant chamber adjacent the outlet portion, the acoustic frequency range relating to the first resonant chamber differing from the acoustic frequency range relating to the second resonant chamber; and
wherein the seal is a knife edge seal that includes one or more knife edge portions supported by a neck portion, the neck portion extends radially outward from the hub with respect to the longitudinal axis such that the first resonant chamber is opposed to the neck portion along the inlet portion, and the second resonant chamber is opposed to a wall of the hub that bounds the flow path.

2. The section as recited in claim 1, wherein the acoustic liner is radially inward of the neck portion with respect to the longitudinal axis, and the hub and the flow guide assembly are dimensioned such that the flow path slopes radially inward from the neck portion to the outlet portion with respect to the longitudinal axis.

3. The section as recited in claim 1, wherein the knife edge seal establishes the sealing relationship with an abradable honeycomb structure mounted to the plurality of vanes in response to rotation of the rotor about the longitudinal axis.

4. The section as recited in claim 1, wherein inlet portion extends between the neck portion and surfaces of the first face sheet.

5. The section as recited in claim 1, wherein the hub and the flow guide assembly are dimensioned such that the flow path slopes radially inward from the inlet portion to the outlet portion with respect to the longitudinal axis.

6. The section as recited in claim 1, wherein the section is a high pressure compressor section of the gas turbine engine.

7. A gas turbine engine comprising:
a fan section including a plurality of fan blades rotatable about an engine longitudinal axis;
a compressor section that defines a core flow path, the compressor section including a first compressor and a second compressor downstream of the first compressor;
a combustor section in fluid communication with the compressor section;
a turbine section that drives the compressor section and the fan section; and
wherein at least one of the compressor section and the turbine section includes a rotor assembly, the rotor assembly comprising:
a rotor including a hub carrying a plurality of blades, the hub rotatable about the engine longitudinal axis, and a seal that extends outwardly from the hub to establish a sealing relationship with a plurality of vanes distributed about the engine longitudinal axis;
a flow guide assembly arranged about the longitudinal axis, the flow guide assembly secured to an engine static structure such that an annular flow path is defined between the hub and the flow guide assembly, the annular flow path including an inlet portion defined along the seal and an outlet portion, and the flow guide assembly including an acoustic liner that extends about the longitudinal axis to bound the annular flow path;
wherein the second compressor section comprises the rotor assembly, and the outlet portion communicates with a cooling plenum that extends radially inward of a combustor of the combustor section with respect to the engine longitudinal axis;
wherein the seal includes one or more knife edge portions supported by a neck portion, the neck portion extending radially outward from the hub with respect to the engine longitudinal axis;
wherein the acoustic liner defines at least one resonant chamber dimensioned with respect to an acoustic frequency range relating to the annular flow path;
wherein the acoustic liner includes a shell having first and second face sheets opposed to each other to establish the at least one resonant chamber, the acoustic liner includes a honeycomb core disposed in the at least one resonant chamber, the honeycomb core includes a plurality of honeycomb cells that are separate and distinct from the shell, and the first face sheet spans across the plurality of honeycomb cells such that surfaces of the first face sheet bound the annular flow path;
wherein opposed walls of the hub and the flow guide assembly are dimensioned such that the opposed walls along the annular flow path slope radially inward in an aftward direction from the neck portion toward the outlet portion with respect to the engine longitudinal axis and such that the wall of the hub bounding the annular flow path has an arcuate-shaped geometry that more gradually tapers in the aftward direction towards the outlet portion relative to the longitudinal axis; and
wherein the hub and the flow guide assembly are dimensioned such that the annular flow path has a substantially constant cross-sectional width at locations along the acoustic liner.

8. The gas turbine engine as recited in claim 7, wherein the inlet portion is radially outward of the outlet portion.

9. The gas turbine engine as recited in claim 7, further comprising:
an exit diffuser mounted to the engine static structure;
wherein the surfaces of the first face sheet bounding the annular flow path define a plurality of perforations that interconnect the annular flow path and the plurality of honeycomb cells, and a width of each one of the plurality of perforations is less than a width of a respective one of the plurality of honeycomb cells; and
wherein the exit diffuser is downstream of an axially aftmost stage of the second compressor section with respect to the engine longitudinal axis, the exit diffuser establishes an exit of the second compressor section along the core flow path for providing core airflow to the combustor section in operation, the exit diffuser includes a row of exit vanes that extend across the core flow path, and the at least one resonant chamber is axially aligned with the exit diffuser with respect to the engine longitudinal axis.

* * * * *